Patented Nov. 6, 1951

2,573,990

UNITED STATES PATENT OFFICE 2,573,990

RECOVERY OF MEDICINAL CREOSOTE

Lloyd T. Sandborn, Crossett, Ark., assignor to Crossett Lumber Company, a corporation of Arkansas No Drawing. Application March 8, 1948,
Serial No. 13,743

6 Claims. (Cl. 260—627)

This invention relates to improvement in the process of separating creosote from the other constituents in the oils which are obtained by the destructive distillation of wood. In addition to guaiacol and creosol which are the most desirable constituents of creosote these oils contain a variety of other phenolic constituents and also some acidic and neutral materials.

Heretofore published methods of isolating creosote from such oils have usually involved the following steps:

1. Treating the oils with a solution of sodium hydroxide or equivalent alkali to dissolve phenolic constituents. In some cases the oil is treated with sodium bicarbonate or sodium carbonate for the removal of acids before treating it with sodium hydroxide.

2. Separating the layers.

3. Heating the alkaline solution of phenolic material to steam distill off any neutral material which may be suspended in it. Air is usually blown through the solution during distillation.

4. Acidifying the solution to liberate phenolic material which separates as an oily layer 5. Separating the crude phenolic oil from the aqueous layer and washing it with water.

6. Fractional distillation of the crude phenolic oil to give a selected fraction with suitable boiling range and specific gravity.

Exact specifications for the product will vary somewhat depending on the use to be made of the creosote. For some purposes at the present time it is required that the specific gravity be not less than 1.076 at 25° C. and that 90% of the material boil between 203 and 220° C. This material is sometimes called "Beechwood Creosote." Since guaiacol and creosol have higher specific gravities than any of the other constituents, specific gravity is a convenient means of determining the quality of the finished product. A high specific gravity indicates a high guaiacol content and is therefore considered to be better adapted to medicinal purposes.

One process involving these steps is described in U. S. Patent No. 1,199,271, Reissue 14,388 issued to Lee F. Hawley.

Step 3 above, dealing with the removal of suspended neutral material by steam distillation, is expensive and time consuming because it is necessary to heat and cool large volumes of solution and to distill an appreciable amount of water along with the organic matter that must be removed. In many cases the solution, after boiling, still contains some insoluble material in such fine suspension that it can be settled out and separated only after prolonged standing.

I have found that if extraction with an organic solvent such as benzene, carbon tetrachloride, or ethyl ether is substituted for steam distillation, the removal of neutral material can be accomplished quickly and cheaply. Furthermore I have discovered that the use of solvent extraction also serves to remove from the alkaline solution certain constituents which have a lower specific gravity than the products desired and which, because of their solubility in alkaline phenolate solutions, are not volatile with steam. In the conventional procedure such constituents remain in the creosote and cause a lowering in specific gravity of the product. Although the identity of these low specific gravity alkali soluble materials has not been definitely established their solubility in alkali indicates that they are phenolic in nature. In this application these materials will be referred to as objectionable phenolic constituents to distinguish them from neutral materials and from desirable phenols such as guaiacol and creosol. The specific gravity of these materials serves as a measure of their undesirability.

I have discovered that an additional advantage over the steam distillation results from the fact that the solvent extraction method permits use of more concentrated alkali solutions thereby requiring the handling of smaller volumes of solution and permitting substantial savings in cost of equipment. Tests have shown that, by employing the solvent method, products with satisfactory specific gravity can be obtained using 7, 10, 14, 20, and even 40% concentrations of sodium hydroxide, while with the steam distillation method, the quality of the creosote as indicated by specific gravity, drops off with concentrations above 5% With a sodium hydroxide concentration of 20% or more, there is a tendency for solids to separate from the alkaline solution. The separation of solids introduces mechanical difficulties in handling the solution and while such difficulties are purely mechanical it is most convenient to avoid them by the use of 15-20% concentrations of sodium hydroxide.

Under present economic conditions sodium hydroxide is the most favorable alkali but equivalent alkalies such as potassium or lithuim hydroxide may be used With potassium hydroxide, concentrations as high as 40% can be used without the separation of solids.

The fact that solvent extraction permits the use of higher concentrations of sodium hydroxide than are feasible with steam distillation appears to result from the fact that the crude wood oil contains some low specific gravity constituents which are much more soluble in sodium phenolate solution than they are in water and the extent of their solubility appears to increase as the concentration of phenolate in the aqueous solution is increased. Consequently the amount of low specific gravity material extracted from the wood oil into an aqueous alkaline solution is increased when the concentration of the alkali used for extraction is increased. While the solubility of these materials in the aqueous solution tends to prevent their removal by distillation with steam it does not prevent their being extracted from the aqueous solution with a solvent. Although many of the low specific gravity constituents which dissolve in the alkali are neutral, some of them appear to contain phenolic groups which exist in the free phenol condition rather than in the phenolate condition. If the solvent which is used for extraction of the alkaline solution is washed with an additional amount of sodium hydroxide it is possible to recover an appreciable amount of material which has the same boiling range as creosote but which has a much lower specific gravity. Obviously any method which permits the removal of these low specific gravity impurities will improve the quality of the product.

I have found that the extraction step may be carried out with any liquid organic solvent which is immiscible in water or with alkaline solutions and which dissolves wood oils and which is chemically inert toward alkali and toward phenolic material under alkaline conditions. Solvents which fail to meet these requirements are not suitable. Esters cannot be used because they react with alkali. Low molecular weight alcohols and ketones are not suitable because they are soluble in water. Even normal butyl alcohol, which is substantially immiscible with water at room temperature, has been found to be soluble in the alkaline solution of creosote and is also unsuitable. Solvents such as benzyl chloride and allyl chloride in which the chlorines are unusually active are unsuitable because such compounds react with phenols in alkaline solution to give ethers. In most cases halogenated hydrocarbons are sufficiently stable to permit their use. However, to exclude the exceptions, such solvents are defined as halogenated hydrocarbons in which the halogens are stable under the conditions of extraction. Hydrocarbon solvents such as petroleum ether can be used but they are less effective solvents for the constituents of wood oils.

By liquid solvents is meant solvents which are liquid under the conditions of extraction. While for reasons of economy I prefer to make such extractions at room temperature and under atmospheric pressure, I do not wish to limit myself to such conditions. Solvents which are solid at room temperature but liquid at higher temperature can be used if extraction is done at elevated temperature. In case temperatures above 100° C. are used the extraction can be made under pressure sufficiently high to keep the water in liquid form. Likewise materials which are gases at ordinary temperature but which are liquid at lower temperatures or under superatmospheric pressure can be used if the extraction is made under increased pressure and at lower temperature as long as the temperature is not so low that the aqueous solution will solidify. It should be understood that the only limitations regarding temperature and pressure are those which assure that both the aqueous solution and the solvent will be liquid under extraction conditions.

Aromatic hydrocarbons, ethers, and halogenated hydrocarbons in which the halogen is stable under extraction conditions are suitable solvents for extraction. Such solvents are typical of a large group of solvents which can be defined by the term "a liquid organic solvent for wood oil, which solvent is immiscible with and is chemically inert toward alkaline solutions of creosote."

Extraction should be continued, by either batch or continuous methods, until addition of water to a portion of the phenolate solution no longer causes turbidity. I have found that extraction of the alkaline solution with three 500 ml. portions of solvent for each liter of wood oil treated represents a maximum beyond which it is not advisable to go. In most cases a single extraction with 500 ml. of solvent per liter of oil has been adequate. Use of larger amounts of solvent lowers the yield of creosote slightly by the removal of desirable phenolic constituents and therefore for economic reasons should be avoided. In one case in which eight 500 ml. portions of solvent per liter of oil, instead of three, were used, the yield of creosote decreased from 16.2% to 14.8% without any detectable improvement in quality of product. The solvent may be recovered by distillation in known manner and reused in the process.

In respects other than those already stated the same precautions should be employed in the solvent extraction method as in conventional procedures. It is recommended that the usual precautions be taken concerning the selection of the amount of alkali. Attention is called to the difference between concentration of alkali and amount of alkali. Although the amount of wood oil which will dissolve in the aqueous alkaline solution may be increased by increasing either the concentration or the amount of alkali used, this increased solubility results from other causes. In the case of increased concentration the dissolved material is not held chemically and is easily extracted from the aqueous solution with solvents. When the amount of alkali is increased, larger amounts of phenolic materials are converted to phenolates, which materials are not easily extracted from the alkaline solution. It is well known that the phenols present in wood oil vary in their ability to react with alkali and that those phenols which are most readily dissolved in caustic alkali are those which are most desirable in the finished product, especially as regards specific gravity. Consequently it is conventional practice in the refining of creosote to use less than the amount of caustic required to remove all of the phenol. If too much alkali is used the specific gravity of the product will be lowered and if too little alkali is used the yield of product will be low. Different batches of oil vary somewhat in alkali requirement. Since a considerable amount of such variations results from a variation in the amount of organic acid present in the oil, it is usually desirable to remove acidic material by washing the oil with solutions of sodium bicarbonate or sodium carbonate prior to the step of dissolving the phenolic material in sodium hydroxide. After such removal of organic acids, the use of 150 grams of sodium hydroxide per liter of oil has been found to yield 16.71% of creosote with a specific gravity of 1.0791 at 25° C. which result is satisfactory as regards both yield and quality of product. The use of 200 g. of sodium hydroxide gave a 24.85% yield of creosote with sp. g. 1.0701, which is too low, and the use of 105 grams per liter gave a yield of only 11.43% of creosote with sp. g. of 1.0841.

As herein described, my improved process contemplates principally the production of creosote which meets the specifications for medicinal creosote; that is, creosote with a specific gravity of not less than 1.076 at 25° C. and of which 90% or more boils between 203° and 220° C. at 760 mm. In case it is desired to obtain other grades of creosote or to meet either higher or lower specific gravity specifications, the information given above, as well as that contained in the examples hereinafter set forth, will permit one skilled in the art to vary the quality of the product by varying the amount of alkali used.

After the extraction with an organic solvent is completed, the alkaline solution is acidified to about 6 pH whereupon crude creosote separates as an oily layer and the layers are separated. Any acid can be used for this purpose, or neutralization can be accomplished by passing carbon dioxide gas into the alkaline solution. If desired, gases containing carbon dioxide, such as stack gases or the gases from lime kilns, can be used. In most cases it will be more convenient to use sulfuric acid. The resulting crude creosote can be distilled directly although it is best to wash it with water before distillation to remove traces of inorganic salts which might otherwise cause foaming of the liquid or incrusting of heat exchange surfaces.

The crude oil is usually distilled under reduced pressure taking such fraction as meets the required specifications for any specific grade of creosote. It has been found that at 50 mm. pressure the fraction boiling between 112° and 137° C. has the boiling range of medicinal creosote. The conditions of distillation may be varied as regards pressure and type of still and column so long as the usual precautions known to those skilled in the art are taken.

This process can be applied to any oil containing guaiacol and creosol but the advantages of the process are most evident in the processing of oils which are obtained by the distillation of wood. The exact method of obtaining such oils will vary depending on the method of treating the wood distillation product. One useful oil is a fraction boiling at 195–230° C. which oil is distilled from the tar that settles from pyroligneous acid. The residual oil from methyl alcohol stills and which is called "alcohol oil," may also be treated in accordance with my improved process to obtain creosote.

The process just described is illustrated further by way of the following example, using a wood oil having a boiling range from 195–230° C. which has been distilled from the tar that settles from pyroligneous acid.

A one liter sample of wood oil, weighing 1042 g., was washed with an equal volume of a 10% sodium carbonate solution. The oil layer was then washed with 1500 ml. of a 10% sodium hydroxide solution giving a 300 ml. layer of oil and 2080 ml. of aqueous solution. The aqueous solution was extracted with three 500 ml. portions of benzene after which it was acidified to approximately 6 pH by the addition of 593 ml. of 250 grams per liter sulfuric acid solution. The 330 ml. of phenolic oil which separated was washed with water and was then fractionally distilled, collecting the fraction boiling at 112–137° C. at 50 mm. The yield obtained was 168.8 grams (16.2% of original oil) of material with sp. g. 1.0830 at 25° C. In this case there was used a 30 inch screen packed distillation column of the type described in Ind. Eng. Chem. Anal. Ed. 15, 290, 1943. In other tests a four foot Vigeraux column or a 20 plate Bruun column have given satisfactory results.

The results of other examples employing the same procedure but with variations in concentrations of sodium hydroxide and type of solvent used are summarized below, one liter of wood oil being treated in each example:

| Example | Solvent | Ml. NaOH | Conc. NaOH | Per Cent Yield | Sp. G. 25/25 |
|---|---|---|---|---|---|
| | | | Per cent | | |
| 1 | Benzene | 1,500 | 10 | 16.21 | 1.0830 |
| 2 | do | 750 | 20 | 17.32 | 1.0827 |
| 3 | do | 375 | 40 | 19.62 | 1.0770 |
| 4 | Carbon Tetrachloride | 1,500 | 10 | 16.90 | 1.0775 |
| 5 | Ethyl Ether | 1,500 | 10 | 17.18 | 1.0789 |
| 6 | Petroleum Ether | 1,500 | 10 | 20.77 | 1.0723 |

The material obtained in Example 6, it will be noted, has a specific gravity below that required for medicinal creosote. It was found that by taking only the material boiling at 112–131.5° C./50 mm. there was obtained a 14.35% yield of material with sp. g. 1.0775.

The step in the separation of creosote from wood oil with which this invention is most concerned is that of removing objectionable material by means of a solvent extraction instead of the usual method of steam distillation. It is to be understood that at other stages in the process it is possible to use any of the known means of accomplishing the purposes which have been hereinbefore mentioned.

From the foregoing it will be apparent that I have devised an improved process for recovering creosote from oils containing the same which is simple and economical and by means of which large yields may be obtained. While I have described several ways of carrying out my invention it will be understood that it is not to be limited thereto but that it is susceptible of various changes and modifications without departing from the spirit thereof, and I desire, therefore, that only such limitations shall be placed thereupon as are specifically set forth in the appended claims.

What I claim is:

1. In the process of recovering medicinal creosote from an aqueous alkaline phenolate solution formed by reacting wood oils with an aqueous solution of caustic alkali, the step which consists in extracting from said solution only those constituents having a lower specific gravity than the product sought with a liquid organic solvent for wood oil which is immiscible in and chemically inert toward said aqueous alkaline solution.

2. The step defined in claim 1 in which the solvent employed is benzene.

3. In the process for removing medicinal creosote from an aqueous alkaline phenolate solution formed by reacting wood oils with an aqueous solution of caustic alkali, the step which consists in extracting from said solution only those constituents having a lower specific gravity than the product sought with benzene in a plurality of extractions in which approximately 500 ml. of benzene is employed per liter of wood oil being treated.

4. A process as set forth in claim 3 in which the extractions are limited to 3.

5. In the process for recovering medicinal creosote from wood oils, the steps which consist in reacting said oils with an aqueous solution of caustic alkali having a concentration of from 7 to 40% to form an aqueous alkaline phenolate solution, and extracting from said aqueous alkaline phenolate solution only those constituents having a lower specific gravity than the product sought with a liquid organic solvent for wood oils which is immiscible in and chemically inert toward said aqueous alkaline solution.

6. In the process for removing medicinal creosote from wood oils, the steps which consist in reacting said oils with an aqueous solution of caustic alkali having a concentration of from 7 to 40% to form an aqueous alkaline phenolate solution and extracting from said aqueous alkaline phenolate solution only those constituents having a lower specific gravity than the product sought with benzene in a plurality of extractions in which approximately 500 ml. of benzene is employed per liter of wood oil being treated.

LLOYD T. SANDBORN.

REFERENCES CITED

The following references are of record in the file of this patent:

UNITED STATES PATENTS

| Number | Name | Date |
| --- | --- | --- |
| 1,651,617 | Moser | Dec. 6, 1927 |
| 2,043,102 | Kester | June 2, 1936 |
| 2,298,816 | Ambler | Oct. 13, 1942 |
| 2,301,270 | Gerlicher | Nov. 10, 1942 |
| 2,313,385 | Levesque | Mar. 9, 1943 |
| 2,342,386 | Berger et al. | Feb. 22, 1944 |
| 2,357,252 | Berger et al. | Aug. 29, 1944 |
| 2,358,979 | Isham et al. | Sept. 26, 1944 |
| 2,523,154 | Shmidl | Sept. 19, 1950 |